United States Patent [19]
Burge

[11] Patent Number: 6,098,298
[45] Date of Patent: Aug. 8, 2000

[54] LEVEL

[76] Inventor: Joseph Burge, 192A Main Road, Romford, Essex RM2 5HA, United Kingdom

[21] Appl. No.: 09/086,454

[22] Filed: May 28, 1998

[51] Int. Cl.[7] .................................................. G01C 9/28
[52] U.S. Cl. ................................................. 33/371; 33/383
[58] Field of Search ............................... 33/370, 371, 372, 33/373, 374, 379, 383, 809

[56] References Cited

U.S. PATENT DOCUMENTS

| | | | |
|---|---|---|---|
| 2,632,256 | 3/1953 | Will | 33/372 |
| 2,670,638 | 3/1954 | Roy, Sr. | 33/373 |
| 2,752,693 | 7/1956 | Wullschleger | 33/379 |
| 3,104,477 | 9/1963 | Edwill | 33/374 |
| 3,277,579 | 10/1966 | Murphy | 33/372 |
| 3,638,325 | 2/1972 | Petrik | 33/371 |
| 5,263,260 | 11/1993 | Smith | 33/371 |
| 5,522,146 | 6/1996 | Warburton | 33/371 |

FOREIGN PATENT DOCUMENTS

| | | | |
|---|---|---|---|
| 8001793 | 10/1981 | Netherlands . | |
| 1210 | 10/1907 | United Kingdom | 33/374 |

*Primary Examiner*—G. Bradley Bennett

[57] ABSTRACT

A new level for determining whether surfaces are level and plumb. The inventive device includes an elongate main member and a elongate insertion member. The main member has first and second ends, and top and bottom faces. The top face of the main member has an hole therein. A first bubble vial is provided in the hole of the top face of the main member. The elongate insertion member has first and second ends, and top and bottom faces. The top face of the insertion member has an hole therein. A second bubble vial is provided in the hole of the top face of the insertion member. The second end of the insertion member is slidably received by the first end of the main member. The insertion member is biased away from the second end of the main member in a direction along the longitudinal axis of the main member.

17 Claims, 2 Drawing Sheets

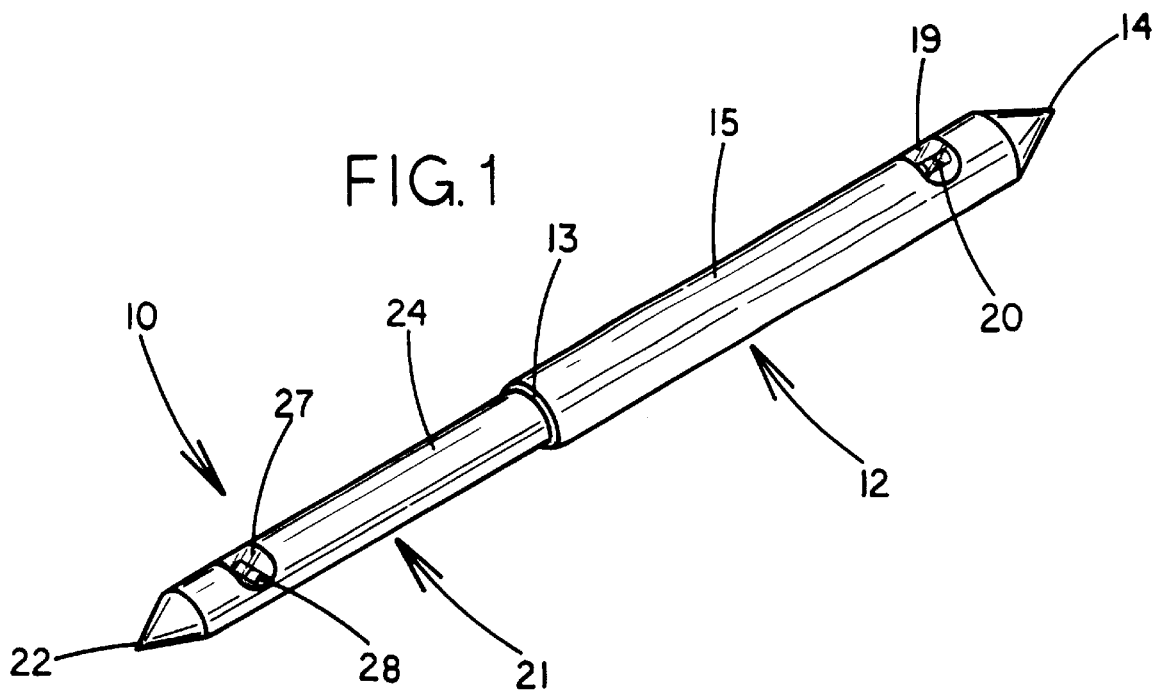
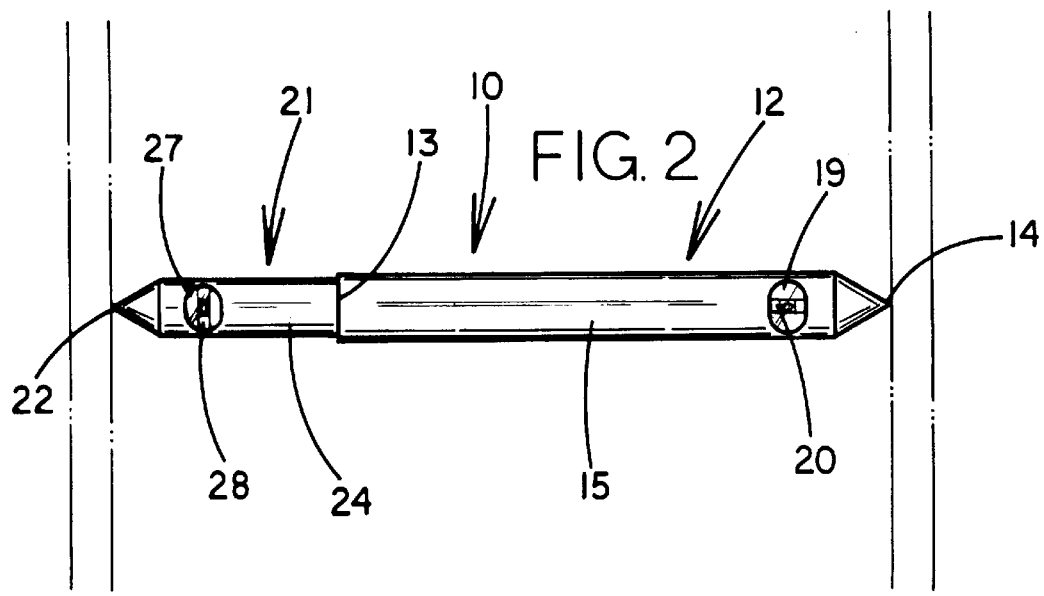

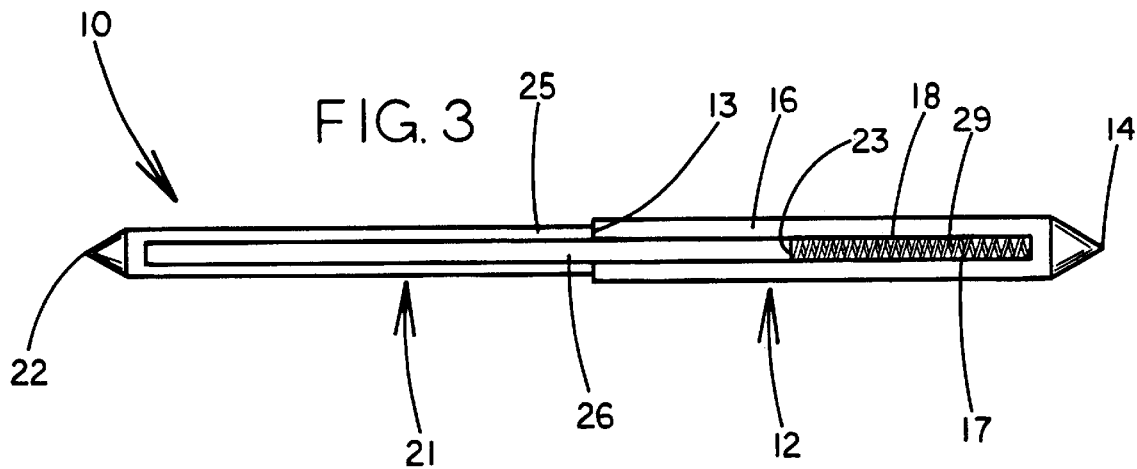
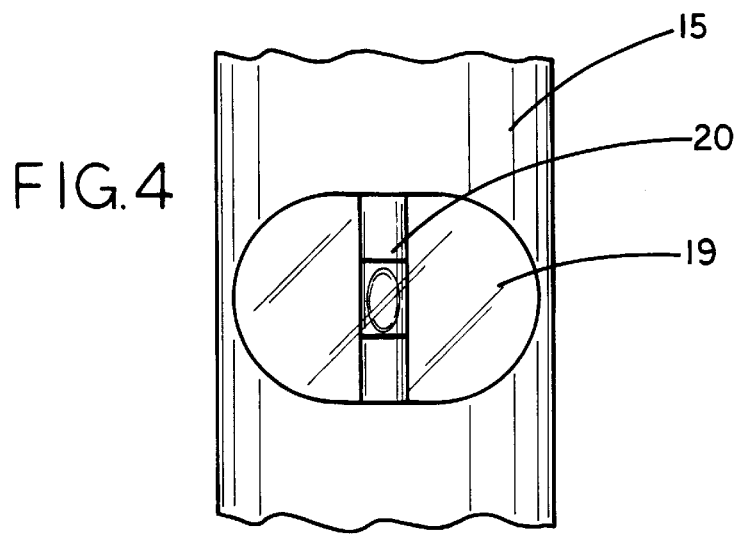

LEVEL

BACKGROUND OF THE INVENTION

1. Field of the Invention

The present invention relates to levels and more particularly pertains to a new level for determining whether surfaces are level and plumb.

2. Description of the Prior Art

The use of levels is known in the prior art. More specifically, levels heretofore devised and utilized are known to consist basically of familiar, expected and obvious structural configurations, notwithstanding the myriad of designs encompassed by the crowded prior art which have been developed for the fulfillment of countless objectives and requirements.

Known prior art levels include U.S. Pat. No. 5,155,917; U.S. Pat. No. 4,607,437; U.S. Pat. No. 4,970,796; U.S. Pat. No. 3,103,749; U.S. Pat. No. 1,821,319; PCT Patent No. WO 97/13119 A1 (inventor: Machler); and EPO Patent No. EP 0 714 014 A1 (inventor: Beck).

While these devices fulfill their respective, particular objectives and requirements, the aforementioned patents do not disclose a new level. The inventive device includes an elongate main member and a elongate insertion member. The main member has first and second ends, and top and bottom faces. The top face of the main member has an hole therein. A first bubble vial is provided in the hole of the top face of the main member. The elongate insertion member has first and second ends, and top and bottom faces. The top face of the insertion member has an hole therein. A second bubble vial is provided in the hole of the top face of the insertion member. The second end of the insertion member is slidably received by the first end of the main member. The insertion member is biased away from the second end of the main member in a direction along the longitudinal axis of the main member.

In these respects, the level according to the present invention substantially departs from the conventional concepts and designs of the prior art, and in so doing provides an apparatus primarily developed for the purpose of determining whether surfaces are level and plumb.

SUMMARY OF THE INVENTION

In view of the foregoing disadvantages inherent in the known types of levels now present in the prior art, the present invention provides a new level construction wherein the same can be utilized for determining whether surfaces are level and plumb.

The general purpose of the present invention, which will be described subsequently in greater detail, is to provide a new level apparatus and method which has many of the advantages of the levels mentioned heretofore and many novel features that result in a new level which is not anticipated, rendered obvious, suggested, or even implied by any of the prior art levels, either alone or in any combination thereof.

To attain this, the present invention generally comprises an elongate main member and an elongate insertion member. The main member has first and second ends, and top and bottom faces. The top face of the main member has an hole therein. A first bubble vial is provided in the hole of the top face of the main member. The elongate insertion member has first and second ends, and top and bottom faces. The top face of the insertion member has an hole therein. A second bubble vial is provided in the hole of the top face of the insertion member. The second end of the insertion member is slidably received by the first end of the main member. The insertion member is biased away from the second end of the main member in a direction along the longitudinal axis of the main member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new level apparatus and method which has many of the advantages of the levels mentioned heretofore and many novel features that result in a new level which is not anticipated, rendered obvious, suggested, or even implied by any of the prior art levels, either alone or in any combination thereof.

It is another object of the present invention to provide a new level which may be easily and efficiently manufactured and marketed.

It is a further object of the present invention to provide a new level which is of a durable and reliable construction.

An even further object of the present invention is to provide a new level which is susceptible of a low cost of manufacture with regard to both materials and labor, and which accordingly is then susceptible of low prices of sale to the consuming public, thereby making such level economically available to the buying public.

Still yet another object of the present invention is to provide a new level which provides in the apparatuses and methods of the prior art some of the advantages thereof, while simultaneously overcoming some of the disadvantages normally associated therewith.

Still another object of the present invention is to provide a new level for determining whether surfaces are level and plumb.

Yet another object of the present invention is to provide a new level which includes an elongate main member and a elongate insertion member. The main member has first and second ends, and top and bottom faces. The top face of the main member has an hole therein. A first bubble vial is provided in the hole of the top face of the main member. The elongate insertion member has first and second ends, and top and bottom faces. The top face of the insertion member has an hole therein. A second bubble vial is provided in the hole of the top face of the insertion member. The second end of the insertion member is slidably received by the first end of the main member. The insertion member is biased away from the second end of the main member in a direction along the longitudinal axis of the main member.

Still yet another object of the present invention is to provide a new level that may be used in awkward areas to measure level and plumbs in a hands-free manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new level according to the present invention.

FIG. 2 is a schematic side view of the present invention in use between two objects.

FIG. 3 is a schematic bottom view of the present invention.

FIG. 4 is a schematic partial view of a bubble vial of the present invention.

DESCRIPTION OF THE PREFERRED EMBODIMENT

With reference now to the drawings, and in particular to FIGS. 1 through 4 thereof, a new level embodying the principles and concepts of the present invention and generally designated by the reference numeral 10 will be described.

As best illustrated in FIGS. 1 through 4, the level 10 generally comprises an elongate main member 12 and a elongate insertion member 21. The main member 12 has first and second ends, and top and bottom faces. The top face 15 of the main member 12 has an hole therein. A first bubble vial 20 is provided in the hole 19 of the top face 15 of the main member 12. The elongate insertion member 21 has first and second ends, and top and bottom faces. The top face 24 of the insertion member 21 has an hole therein. A second bubble vial 28 is provided in the hole 27 of the top face 24 of the insertion member 21. The second end 23 of the insertion member 21 is slidably received by the first end 13 of the main member 12. The insertion member 21 is biased away from the second end 14 of the main member 12 in a direction along the longitudinal axis of the main member 12.

In closer detail, the elongate main member 12 has a longitudinal axis, first and second ends 13,14, and top and bottom faces 15,16. The bottom face 16 is designed for stable resting of the main member 12 on a surface. The top face 15 of the main member 12 is generally arcuate while the bottom face 16 of the main member 12 is generally planar such that the main member 12 has a generally D-shaped cross section taken generally perpendicular to the length of the main member 12. The second end 14 of the main member preferably tapers to a point such that a conical portion is formed at the second end 14 of the main member 12.

The main member 12 has an elongate bore 17. The elongate bore 17 is the extended from the first end 13 of the main member 12 towards the second end 14 of the main member 12 along the longitudinal axis of the main member 12. Preferably, the bore 17 has a generally D-shaped cross section. The bottom face 16 of the main member 12 has an elongate slot 18 providing an opening into the elongate bore 17. The elongate slot 18 is extended along the length of the elongate bore 17 from the first end 13 of the main member 12 towards the second end 14 of the main member 12.

The top face 15 of the main member 12 has an hole therein. The hole 19 of the top face 15 of the main member 12 is preferably positioned towards the second end 14 of the main member 12. A first bubble vial 20 is provided in the hole 19 of the top face 15 of the main member 12. Preferably, the first bubble vial 20 has a length which is extended substantially parallel to the longitudinal axis of the main member 12.

The elongate insertion member 21 has a longitudinal axis, first and second ends 22,23, and top and bottom faces 24,25. Like the main member, the top face 24 of the insertion member 21 is generally arcuate while the bottom face 25 of the insertion member 21 is generally planar such that the insertion member 21 has a generally D-shaped cross section taken generally perpendicular to the length of the insertion member 21. The first end 22 of the insertion member tapers to a point such that a conical portion is formed at the first end 22 of the insertion member 21.

The bottom face 25 of the insertion member 21 has an elongate ridge 26. The elongate ridge 26 is extended along the length of the elongate bore 17 from the second end 23 of the insertion member 21 towards the first end of the insertion member 21 to the conical portion of the insertion member 21 adjacent the conical portion of the main member 12. The top face 24 of the insertion member 21 has an hole therein. The hole 27 of the top face 24 of the insertion member 21 is preferably positioned towards the first end 22 of the insertion member 21. A second bubble vial 28 is provided in the hole 27 of the top face 24 of the insertion member 21. Preferably, the length of the second bubble vial 28 is extended substantially perpendicular to the longitudinal axis of the insertion member 21.

The first end 13 of the main member 12 slidably receives the second end 23 of the insertion member 21. In particular, the second end 23 of the insertion member 21 is slidably inserted from the first end 13 of the main member 12 into the elongate bore 17 of the main member 12. The elongate ridge 26 of the insertion member 21 is slidably inserted into the elongate slot 18 of the main member 12. Preferably, the longitudinal axis of the insertion member 21 is coaxial with the longitudinal axis of the main member 12. The insertion member 21 is biased away from the second end 14 of the main member 12 in a direction along the longitudinal axis of the main member 12. Preferably, a spring 29 biases the insertion member 21 away from the second end 14 of the main member 12. The spring 29 is disposed in the elongate bore 17 of the main member 12 and is positioned between the second end 23 of the insertion member 21 and the second end 14 of the main member 12.

Optionally, a hold means, such as a catch, may be provided so that the length of the insertion member may be held in position with respect to the length of the main member. Additionally, the insertion member may include calibrated markings and indicia on it so that a user may be able to determine the distance between two objects measured from the pointed ends 14,22 of said main member and the insertion member.

In use, the level 10 is designed for allowing a user use of level in awkward places. As illustrated in FIG. 2, the level 10 may be used to determine if two vertical objects are plum by placing the level 10 between the objects so that the first end of the insertion member about one object and the second end of said main member abuts another object. The spring provides a biasing force so that the pointed ends are forced apart from each other to hold the level between the two objects so that the user is now required to further hold on to the level. A user may now use the bubble vials on the level to determine the plumb of the object.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A level, comprising:

an elongate main member having a longitudinal axis, first and second ends, and top and bottom faces, said bottom face being substantially planar for resisting rolling of said main member when the bottom face of said main member is rested on a surface;

said top face of said main member having an hole therein;

a first bubble vial being provided in said hole of said top face of said main member;

an elongate insertion member having a longitudinal axis, first and second ends, and top and bottom faces;

said top face of said insertion member having an hole therein;

a second bubble vial being provided in said hole of said top face of said insertion member;

said first end of said main member slidably receiving said second end of said insertion member;

said insertion member being biased away from said second end of said main member in a direction along said longitudinal axis of said main member;

wherein said first end of said main member has an elongate bore, said elongate bore being extended from said first end of said main member towards said second end of said main member, wherein said second end of said insertion member is slidably inserted from said first end of said main member into said elongate bore of said main member;

wherein said bottom face of said main member has an elongate slot providing an opening into said elongate bore, said elongate slot being extended along the length of said elongate bore from said first end of said main member towards said second end of said main member, wherein said bottom face of said insertion member has an elongate ridge, said elongate ridge being extended along the length of said elongate bore from said second end of said insertion member towards said first end of said insertion member, and wherein said elongate ridge of said insertion member is slidably inserted into said elongate slot of said main member; and said elongate ridge of said insertion member having a lower surface, said lower surface of said elongate ridge of said insertion portion being coplanar with said bottom face of said main member such that said main member and said insertion member level when resting on a surface.

2. The level of claim 1, wherein said top face of said main member is generally arcuate, and said bottom face of said main member is generally planar such that said main member has a generally D-shaped cross section, wherein said top face of said insertion member is generally arcuate, and said bottom face of said insertion member is generally planar such that said insertion member has a generally D-shaped cross section.

3. The level of claim 1, wherein said second end of said main member is conical and tapers to a single point and said first end of said insertion member is conical and tapers to a single point such that the main member may be pivoted when the points of said first and second ends are abutted against opposing surfaces.

4. The level of claim 1, wherein said longitudinal axis of said insertion member is coaxial with said longitudinal axis of said main member.

5. The level of claim 1, wherein a spring biases said insertion member away from said second end of said main member.

6. The level of claim 5, wherein said spring is disposed in said elongate bore of said main member, said spring being positioned between said second end of said insertion member and said second end of said main member.

7. The level of claim 1, wherein said first bubble vial has a length being extended substantially parallel to said longitudinal axis of said main member.

8. The level of claim 1, wherein said second bubble vial has a length being extended substantially perpendicular to said longitudinal axis of said insertion member.

9. A level, comprising:

an elongate main member having a longitudinal axis, first and second ends, and top and bottom faces, said bottom face being substantially planar for resisting rolling of said main member when the bottom face of said main member is rested on a surface;

said top face of said main member being generally arcuate, said bottom face of said main member being generally planar such that said main member has a generally D-shaped cross section taken generally perpendicular to the length of said main member;

said second end of said main member tapering to a point such that a conical portion is formed at said second end of said main member;

said first end of said main member having an elongate bore, said elongate bore being extended from said first end of said main member towards said second end of said main member along the longitudinal axis of said main member, said bore having a generally D-shaped cross section;

said bottom face of said main member having an elongate slot providing an opening into said elongate bore, said elongate slot being extended along the length of said elongate bore from said first end of said main member towards said second end of said main member;

said top face of said main member having an hole therein, said hole of said top face of said main member being positioned towards said second end of said main member;

a first bubble vial being provided in said hole of said top face of said main member, said first bubble vial having a length being extended substantially parallel to said longitudinal axis of said main member;

an elongate insertion member having a longitudinal axis, first and second ends, and top and bottom faces, said bottom face being for stable resting of said insertion member on a surface;

said top face of said insertion member being generally arcuate, said bottom face of said insertion member being generally planar such that said insertion member has a generally D-shaped cross section taken generally perpendicular to the length of said insertion member;

said first end of said insertion member tapering to a point such that a conical portion is formed at said first end of said insertion member;

said bottom face of said insertion member having an elongate ridge, said elongate ridge being extended along the length of said elongate bore from said second end of said insertion member towards said first end of said insertion member;

said top face of said insertion member having an hole therein, said hole of said top face of said insertion member being positioned towards said first end of said insertion member;

a second bubble vial being provided in said hole of said top face of said insertion member, said second bubble vial having a length being extended substantially perpendicular to said longitudinal axis of said insertion member;

said first end of said main member slidably receiving said second end of said insertion member, said second end of said insertion member being slidably inserted from said first end of said main member into said elongate bore of said main member, said elongate ridge of said insertion member being slidably inserted into said elongate slot of said main member;

said elongate ridge of said insertion member having a lower surface, said lower surface of said elongate ridge of said insertion portion being coplanar with said bottom face of said main member such that said main member and said insertion member level when resting on a surface;

wherein said longitudinal axis of said insertion member is coaxial with said longitudinal axis of said main member; and said insertion member being biased away from said second end of said main member in a direction along said longitudinal axis of said main member, wherein a spring biases said insertion member away from said second end of said main member, said spring being disposed in said elongate bore of said main member, said spring being positioned between said second end of said insertion member and said second end of said main member.

10. A level, comprising:

an elongate main member having a longitudinal axis, first and second ends, and top and bottom faces;

said top face of said main member having an hole therein;

a first bubble vial being provided in said hole of said top face of said main member;

an elongate insertion member having a longitudinal axis, first and second ends, and top and bottom faces;

said top face of said insertion member having an hole therein;

a second bubble vial being provided in said hole of said top face of said insertion member;

said first end of said main member slidably receiving said second end of said insertion member;

said insertion member being biased away from said second end of said main member in a direction along said longitudinal axis of said main member; and wherein said second end of said main member is conical and tapers to a single point and said first end of said insertion member is conical and tapers to a single point such that the main member may be pivoted when the points of said first and second ends are abutted against opposing surfaces.

11. The level of claim 10, wherein said top face of said main member is generally arcuate, and said bottom face of said main member is generally planar such that said main member has a generally D-shaped cross section, wherein said top face of said insertion member is generally arcuate, and said bottom face of said insertion member is generally planar such that said insertion member has a generally D-shaped cross section.

12. The level of claim 10, wherein said first end of said main member has an elongate bore, said elongate bore being extended from said first end of said main member towards said second end of said main member, wherein said second end of said insertion member is slidably inserted from said first end of said main member into said elongate bore of said main member.

13. The level of claim 12, wherein said longitudinal axis of said insertion member is coaxial with said longitudinal axis of said main member.

14. The level of claim 12, wherein a spring biases said insertion member away from said second end of said main member.

15. The level of claim 14, wherein said spring is disposed in said elongate bore of said main member, said spring being positioned between said second end of said insertion member and said second end of said main member.

16. The level of claim 10, wherein said first bubble vial has a length being extended substantially parallel to said longitudinal axis of said main member.

17. The level of claim 10, wherein said second bubble vial has a length being extended substantially perpendicular to said longitudinal axis of said insertion member.

* * * * *